US012640464B2

(12) United States Patent
McKinzie, III et al.

(10) Patent No.: US 12,640,464 B2
(45) Date of Patent: May 26, 2026

(54) BLADE ANTENNA SYSTEM

(71) Applicants: William E. McKinzie, III, Fulton, MD (US); Eric Louis Holzman, Ellicott City, MD (US); Peter Andrew Stenger, Woodbine, MD (US)

(72) Inventors: William E. McKinzie, III, Fulton, MD (US); Eric Louis Holzman, Ellicott City, MD (US); Peter Andrew Stenger, Woodbine, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 730 days.

(21) Appl. No.: 18/073,158

(22) Filed: Dec. 1, 2022

(65) Prior Publication Data

US 2024/0186690 A1 Jun. 6, 2024

(51) Int. Cl.

*H01Q 1/38* (2006.01)
*H01Q 1/36* (2006.01)
*H01Q 1/42* (2006.01)
*H01Q 1/48* (2006.01)
*H01Q 1/27* (2006.01)

(52) U.S. Cl.

CPC ................ *H01Q 1/36* (2013.01); *H01Q 1/42* (2013.01); *H01Q 1/48* (2013.01); *H01Q 1/27* (2013.01)

(58) Field of Classification Search

CPC .. H01Q 1/36; H01Q 1/42; H01Q 1/48; H01Q 1/27; H01Q 9/40; H01Q 1/3275

See application file for complete search history.

(56) References Cited

U.S. PATENT DOCUMENTS 2,944,258 A * 7/1960 Yearout ................ H01Q 13/085 343/807
2,990,547 A * 6/1961 Mcdougal ............ H01Q 25/001 343/908

(Continued)

FOREIGN PATENT DOCUMENTS

KR 10-2007-0018575 A 2/2007
KR 10-2011-0112491 A 10/2011

(Continued)

OTHER PUBLICATIONS

Batel, et al.: "Miniaturization strategy of compact antenna using magneto-dielectric material," 2019 13th European Conference on Antennas and Propagation (EuCAP), 2019, pp. 1-5.

(Continued)

*Primary Examiner* — Dimary S Lopez Cruz
*Assistant Examiner* — Bamidele A Immanuel
(74) *Attorney, Agent, or Firm* — Tarolli, Sundheim, Covell & Tummino LLP

(57) ABSTRACT

One embodiment includes a blade antenna system. The system includes a ground plane and a planar substrate material extending orthogonally from the ground plane. The system also includes conductive material coupled to the planar substrate material in a coplanar or parallel manner. The conductive material can correspond to a radiating conductor. A portion of the planar substrate material between an edge of the conductive material and the ground plane can form a notch. The system further includes a magneto-dielectric material (MDM) arranged parallel with the planar substrate material to cover the notch.

15 Claims, 2 Drawing Sheets

(56) References Cited

U.S. PATENT DOCUMENTS 4,001,834 A * 1/1977 Smith ...................... H01Q 9/28 343/754
4,072,952 A * 2/1978 Demko .................. H01Q 1/283 343/729
4,500,887 A * 2/1985 Nester .................. H01Q 13/085 343/795
4,509,053 A * 4/1985 Robin .................... H01Q 13/10 343/770
4,843,403 A * 6/1989 Lalezari ............... H01Q 13/106 343/700 MS
4,853,704 A * 8/1989 Diaz .................... H01Q 13/085 343/770
5,036,335 A * 7/1991 Jairam ................. H01Q 13/106 343/859
5,070,340 A * 12/1991 Diaz .................... H01Q 13/085 343/846
5,081,466 A * 1/1992 Bitter, Jr. ............. H01Q 13/085 343/767
5,142,255 A * 8/1992 Chang ................... H01P 5/1015 333/204
5,185,611 A * 2/1993 Bitter, Jr. ............... H01Q 1/243 343/702
5,519,408 A * 5/1996 Schnetzer ............ H01Q 13/085 343/770
5,541,611 A * 7/1996 Peng .................... H01Q 13/085 343/786
5,568,159 A * 10/1996 Pelton .................. H01Q 13/085 343/789
5,861,839 A * 1/1999 Upton ...................... H01Q 3/02 342/350
5,872,546 A * 2/1999 Ihara ........................ H01Q 9/40 343/893
6,246,377 B1 * 6/2001 Aiello .................. H01Q 13/085 343/770
6,771,226 B1 * 8/2004 Dujmovic .............. H01Q 21/26 343/797
7,248,223 B2 * 7/2007 Habib ...................... H01Q 1/36
7,545,335 B1 * 6/2009 Wang ..................... H01Q 13/20 343/768
7,573,431 B2 8/2009 Parsche
8,145,208 B2 * 3/2012 Chari ................... H01Q 9/0435 455/562.1
8,547,281 B2 * 10/2013 Ryou ..................... H01Q 15/08 343/749
8,686,918 B1 4/2014 Diaz
8,730,106 B2 5/2014 Parsche
8,736,506 B1 * 5/2014 Brock ...................... H01Q 9/38 343/786
8,749,439 B2 6/2014 Rao et al.
9,147,942 B2 9/2015 Pintos et al.
9,379,430 B2 * 6/2016 Kerselaers ............... H01Q 9/38
9,653,787 B2 * 5/2017 Martinez-Ortigosa ..................... H01Q 21/293
9,837,715 B2 * 12/2017 Sugimoto .............. H01Q 21/00
9,912,041 B1 * 3/2018 Channabasappa ..... H01Q 19/10
10,249,953 B2 * 4/2019 Ng ......................... H01Q 1/286
11,158,947 B2 10/2021 Delaveaud et al.
12,003,027 B2 * 6/2024 Ng ........................... H01Q 1/12
2004/0036659 A1 * 2/2004 Langley ................... H01Q 1/36 343/711
2004/0217912 A1 * 11/2004 Mohammadian .... H01Q 13/085 343/700 MS
2006/0273974 A1 * 12/2006 Bij De Vaate ......... H01Q 21/24 343/770
2007/0024511 A1 * 2/2007 Li ........................ H01Q 9/0428 343/700 MS
2007/0200762 A1 * 8/2007 Frank ....................... H01Q 9/40 343/700 MS
2008/0012962 A1 1/2008 Terakado
2009/0167622 A1 * 7/2009 Yanagisawa ........... H01Q 13/10 343/772
2009/0213025 A1 * 8/2009 Coupez .................... H01Q 9/28 343/807
2010/0103050 A1 * 4/2010 Shimizu ................. H01Q 5/321 343/700 MS
2011/0057848 A1 * 3/2011 Baucom ................. H01Q 19/30 343/705
2011/0068991 A1 * 3/2011 Jang ..................... H05K 1/0253 174/258
2012/0022386 A1 1/2012 Saba
2012/0038531 A1 * 2/2012 Lee .......................... H01Q 9/42 29/600
2012/0200470 A1 * 8/2012 Cooper ................ H01Q 13/085 343/786
2012/0223864 A1 * 9/2012 Kerselaers ............. H01Q 5/364 343/700 MS
2012/0229361 A1 * 9/2012 Goins ...................... H01Q 9/28 343/893
2013/0038495 A1 * 2/2013 Benzel ................. H01Q 21/064 343/770
2014/0285388 A1 * 9/2014 Peng .................... H01Q 13/085 343/860
2017/0133762 A1 * 5/2017 Ng ........................... H01Q 1/42
2017/0222331 A1 * 8/2017 Pance ................ H01Q 21/0068
2017/0317409 A1 * 11/2017 Ayatollahi ............. H01Q 21/28
2021/0288409 A1 * 9/2021 Delaveaud ............... H01Q 1/48
2022/0181052 A1 * 6/2022 Williams .............. H01F 1/0315
2022/0407230 A1 * 12/2022 Sun .......................... H01Q 7/08
2023/0291114 A1 * 9/2023 Frid ......................... H01Q 9/40

FOREIGN PATENT DOCUMENTS

KR 20110112491 A * 10/2011 ............... H01Q 9/40
KR 20120025771 A * 3/2012 ........... H01Q 9/0407
KR 20160014938 A 2/2016
WO 2009/104872 A2 8/2009

OTHER PUBLICATIONS

Ikram, et al.: "Reducing the height of a monopole antenna by using magneto dielectric material," 2016 17th International Symposium on Antenna Technology and Applied Electromagnetics (ANTEM), 2016, pp. 1-2, doi: 10.1109/ANTEM.2016.7550225.

Kabalan, et al.: "Optimization of the use of magneto-dielectric materials for highly miniaturized monopole antennas," 2019 13th European Conference on Antennas and Propagation (EuCAP), 2019, pp. 1-4.

Li, et al.: "A Compact UHF Planar Monopole Antenna Using Magnetodielectric Ferrite Substrate," 2019 Photonics & Electromagnetics Research Symposium—Spring (PIERS-Spring), 2019, pp. 2058-2061, doi: 10.1109/PIERS-Spring46901.2019.9017448.

Venkatarayalu, et al.: "Reducing the size of monopole antennas using magneto-dielectric material loading," Proceedings of the 2012 IEEE International Symposium on Antennas and Propagation, 2012, pp. 1-2, doi: 10.1109/APS.2012.6349374.

Wang, et al.: "Electrically small magneto-dielectric coated VHF monopole antenna," Proceedings of the 2012 IEEE International Symposium on Antennas and Propagation, 2012, pp. 1-2, doi: 10.1109/APS.2012.6349373.

Zhang, et al.: "A Low-profile, Vertically Polarized Antenna for VHF and UHF Applications," 2021 International Conference on Microwave and Millimeter Wave Technology (ICMMT), 2021, pp. 1-3, doi: 10.1109/ICMMT52847.2021.9618037.

WOISR (Written Opinion & International Search Report) for corresponding PCT/US2023/035310 mailed Feb. 8, 2024.

* cited by examiner

BLADE ANTENNA SYSTEM

TECHNICAL FIELD

The present invention relates generally to wireless communication systems, and specifically to a blade antenna system.

BACKGROUND

Wireless communication is a vitally important aspect of modern commercial and military logistics applications. Commercial and military vehicles require the capability of at least one of transmitting and receiving wireless communications signals, such as to support voice communications between the vehicle and a control center, or to provide wireless control commands (e.g., with respect to unmanned or autonomous vehicles). Such wireless communications are provided to and/or from the vehicle based on vehicle antenna systems that may be distributed across one or more exterior surfaces of the vehicle. For example, a given aircraft, spacecraft, watercraft, or even terrestrial vehicle may require a number of different antennae distributed across the exterior of the vehicle to provide a variety of different aspects of communication. An example of such antenna systems includes conventional blade and whip antennas that include an interface with radio signal processing equipment using an analog interface. As an example, such an interface may include a large diameter coaxial cable with low signal loss characteristics and which may be communicatively coupled to a dedicated radio signal processing device.

SUMMARY

One embodiment includes a blade antenna system. The system includes a ground plane and a planar substrate material extending orthogonally from the ground plane. The system also includes conductive material coupled to the planar substrate material in a coplanar or parallel manner. The conductive material can correspond to a radiating conductor. A portion of the planar substrate material between an edge of the conductive material and the ground plane can form a notch. The system further includes a magneto-dielectric material (MDM) arranged parallel with the planar substrate material to cover the notch.

Another embodiment includes a blade antenna system. The system includes a ground plane and a planar substrate material extending orthogonally from the ground plane. The system also includes conductive material coupled to the planar substrate material in a coplanar or parallel manner. The conductive material can correspond to a radiating conductor. An edge of the conductive material can form a nonlinear shape from an approximate middle of the planar substrate material extending to each of opposing ends of the planar substrate material, such that a portion of the planar substrate material between the edge of the conductive material and the ground plane can form a first notch and a second notch on opposing ends of the planar substrate material. The system further includes a magneto-dielectric material (MDM) arranged parallel with the planar substrate material.

Another embodiment includes a blade antenna system. The system includes a printed circuit board (PCB) card extending orthogonally from the ground plane. The PCB card can include a conductive trace portion corresponding to a radiating conductor. A dielectric portion of the PCB card between an edge of the conductive trace portion and the ground plane can form a notch. The conductive trace portion can have a ratio of height to length that is less than one. The system further includes a magneto-dielectric material (MDM) arranged parallel with the planar substrate material.

DETAILED DESCRIPTION

Figure 1:
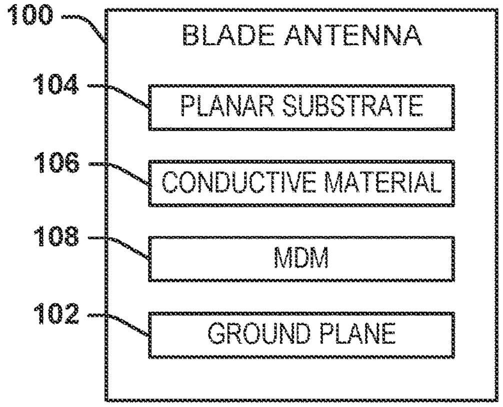
FIG. 1 illustrates an example block diagram of a blade antenna system.

The present invention relates generally to wireless communication systems, and specifically to a blade antenna system. The blade antenna system can be implemented, for example, on an exterior of a vehicle, such as an aircraft, spacecraft, or automobile. The blade antenna system can be oriented in a manner to reduce drag, and can be arranged with a low profile to conserve space, as described in greater detail herein. As described in greater detail herein, the blade antenna system can be arranged as a monopole antenna that can be coupled to a coaxial cable, such as coupled to a communications transmitter. Therefore, the blade antenna system can transmit and/or receive wireless communication signals provided from and/or to a transceiver respectively.

As an example, the blade antenna system can include a ground plane and a planar substrate material extending orthogonally from the ground plane. The blade antenna system can also include a conductive material coupled to the planar substrate material in a coplanar or parallel manner. The conductive material can correspond to a radiating conductor and a portion of the planar substrate material between an edge of the conductive material and the ground plane can form a notch. As an example, the planar substrate material can correspond to a printed circuit board (PCB) card that is fabricated with a conductive trace portion corresponding to the conductive material. Therefore, the planar substrate material and conductive material can be fabricated in an inexpensive manner and can have a compact form-factor.

As an example, the edge of the conductive material can be nonlinear from an approximate middle of the planar substrate material and extending to each of opposing ends of the planar substrate material. For example, the edge of the conductive material can be formed as a semi-elliptical shape having a semi-minor axis extending along the approximate middle of the planar substrate material. The portion of the planar substrate material can form a gap between the edge of the conductive material and the ground plane. The gap can have a minimum dimension between the conductive material and the ground plane along the planar substrate material. The dimension along the planar substrate material orthogonal to the ground plane can thus increase along the length in a nonlinear (e.g., exponential) manner from the approximate middle of the planar substrate material.

In addition, the blade antenna system can include a magneto-dielectric material (MDM) arranged parallel with the planar substrate material to cover the notch. As an example, the MDM can be any of a variety of commercially available MDMs, and can thus be implemented as a low-cost material. For example, the MDM can be bonded to at least the notch using an adhesive material. As an example, the MDM can be arranged to cover the entirety of the notch, as well as a proper-subset portion of the conductive material.

Therefore, the conductive material, the arrangement of the notch, and the MDM can form a radiating element for the blade antenna system operating as a monopole antenna. As a result, as described herein, the blade antenna system can exhibit significantly higher (e.g., approximately three times) the fractional bandwidth at the same center frequency of conventional monopole blade antennas of similar height. Furthermore, the blade antenna system can exhibit a higher product of fractional bandwidth times radiation efficiency relative to a conventional monopole antenna that does not include MDM loading.

FIG. 1 illustrates an example block diagram of a blade antenna system 100. The blade antenna system 100 can be implemented, for example, on an exterior of a vehicle, such as an aircraft or spacecraft. Because the blade antenna system 100 is implemented as having a blade structure, the blade antenna system 100 can be oriented in a manner to reduce drag. As described in greater detail herein, the structure of the blade antenna system 100 can be such that the blade antenna system 100 has a low profile (e.g., less than approximately two and one-half inches tall) to conserve space, as described in greater detail herein. As described in greater detail herein, the blade antenna system 100 can be arranged as a monopole antenna that can be coupled to a coaxial cable, such as coupled to a communications transmitter. Therefore, the blade antenna system 100 can transmit and/or receive wireless communication signals provided from and/or to a transceiver respectively.

The blade antenna system 100 includes a ground plane 102 and a planar substrate material ("PLANAR SUBSTRATE") 104. The ground plane 102 can be formed from any of a variety of conductive materials that can form a ground connection for the blade antenna system 100. As an example, the ground plane 102 can be mounted approximately flush with a surface of the associated vehicle or platform on which the blade antenna system 100 is attached. For example, a coaxial cable can be provided to the ground plane 102, such that an outer conductor can be conductively coupled to the ground plane 102.

The planar substrate material 104 can extend orthogonally from the ground plane 102, and can thus form the blade structure of the blade antenna system 100. The blade antenna system 100 also includes a conductive material 106 that is coupled to the planar substrate material in a coplanar or parallel manner. The conductive material 106 can correspond to a radiating conductor of the blade antenna system 100. A portion of the planar substrate material 104 that is arranged between an edge of the conductive material 106 and the ground plane 102 can form a notch for the blade antenna system 100. As an example, the conductive material 106 can be provided approximately the same on both sides of the planar substrate material 104. For example, the planar substrate material 104 can be formed as a printed circuit board (PCB) card and the conductive material 106 can be formed as a conductive trace portion of the PCB card. Thus, the coupling of the conductive material 106 to the planar substrate material 104 can encapsulate fabrication of the conductive trace portion as part of the PCB card. The conductive material 106 arranged as a conductive trace portion of a PCB card can thus extend through both sides of the planar substrate material 104 as a unitary material (e.g., copper) conductor. Therefore, the planar substrate material 104 and the conductive material 106 can be fabricated in an inexpensive manner and can have a compact form-factor.

As an example, the edge of the conductive material 106 can be nonlinear from an approximate middle of the planar substrate material 104 and extending to each of opposing ends of the planar substrate material 104. For example, the edge of the conductive material 106 can be formed as a semi-elliptical shape having a semi-minor axis extending along the approximate middle of the planar substrate material 104. A portion of the planar substrate material 104 having a minimum width between the edge of the conductive material 106 and the ground plane 102 can form a gap. The gap can have a minimum dimension between the conductive material 106 and the ground plane 102 along the planar substrate material 104, with the dimension increasing along the length of the planar substrate material 104 orthogonal to the ground plane 102 in a nonlinear (e.g., exponential) manner from the approximate middle of the planar substrate material 104.

In addition, the blade antenna system 100 can include a magneto-dielectric material (MDM) 108 arranged parallel with the planar substrate material 104 to cover the notch. As an example, the MDM 108 can be any of a variety of commercially available MDMs. For example, the MDM 108 may correspond to a composite planar material with a relative dielectric constant $\varepsilon_r$ of approximately 6.5 and a relative permeability $\mu_r$ of approximately 6.0 for frequencies below 1 GHz. As an example, the MDM 108 can be bonded to at least the notch using an adhesive material. As an example, the MDM 108 can be arranged to cover the entirety of the notch, as well as a proper-subset portion of the conductive material 106. Therefore, the conductive material 106, the arrangement of the notch, and the MDM 108 can form a radiating element for the blade antenna system 100 operating as a monopole antenna. As a result, as described herein, the blade antenna system 100 can exhibit significantly higher (e.g., approximately three times) the fractional bandwidth at the same center frequency of conventional monopole blade antennas of similar height. Furthermore, the blade antenna system 100 can exhibit a higher product of fractional bandwidth times radiation efficiency relative to a conventional monopole antenna that includes no MDM loading.

Figure 2:
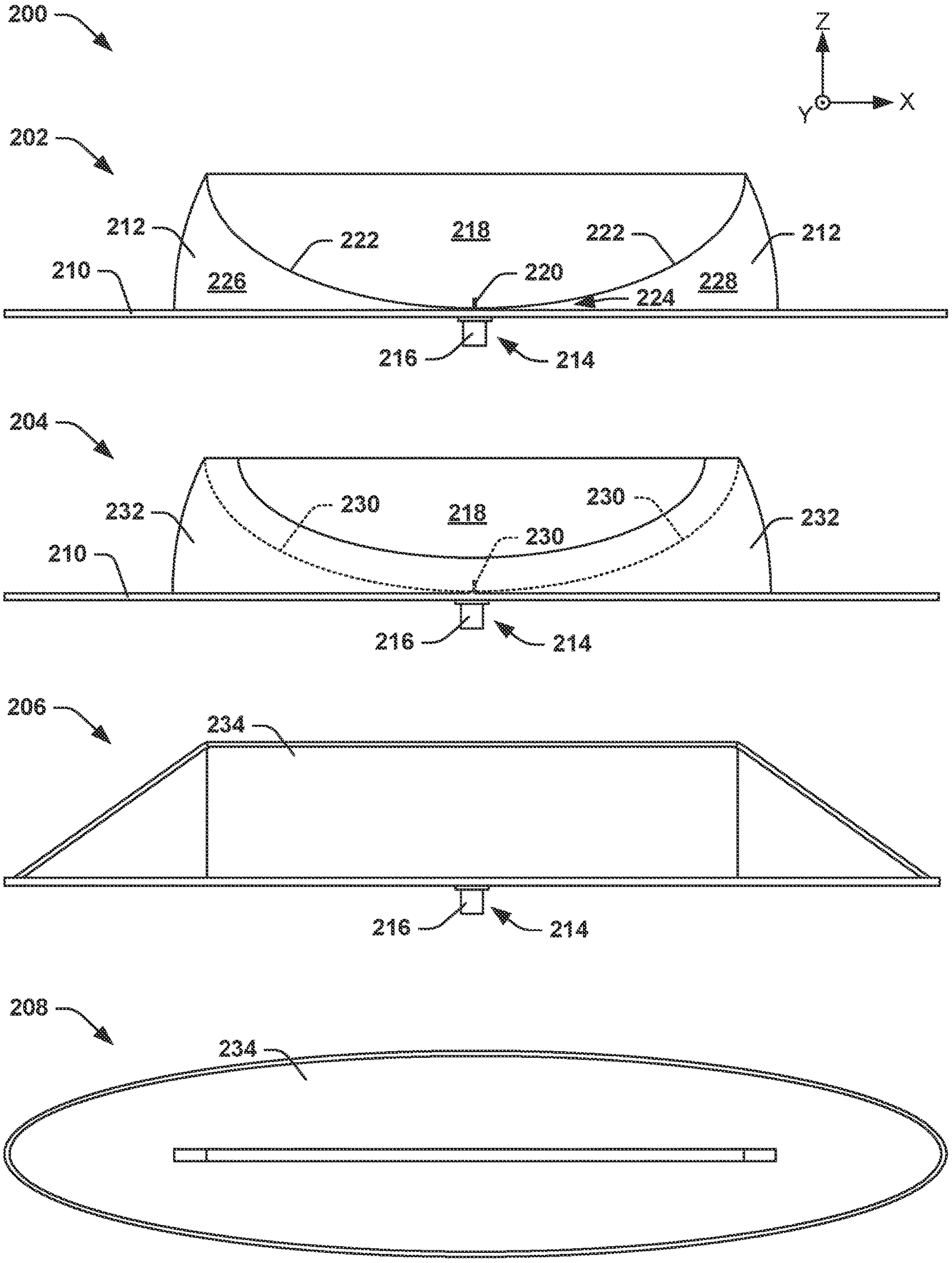
FIG. 2 illustrates an example of a blade antenna system.

FIG. 2 illustrates an example diagram 200 of a blade antenna system. The blade antenna system in the diagram 200 can correspond to the blade antenna system 100 in the example of FIG. 1. The diagram 200 is demonstrated as including a first view 202, a second view 204, a third view 206, and a fourth view 208 of the blade antenna system.

Each of the views 202, 204, and 206 of the blade antenna system is demonstrated as a plan view taken along the −Y axis. In the first view 202, the blade antenna system includes a ground plane 210 and a PCB card 212. The ground plane 210 can be formed from any of a variety of conductive materials, such as copper or aluminum, that can form a ground connection for the blade antenna system. As an example, the ground plane 210 can be mounted approximately flush with a surface of the associated vehicle or platform on which the blade antenna system is attached. In the example of FIG. 2, the blade antenna system includes a coaxial connector 214. The coaxial connector 214 includes an outer conductor 216 that is conductively coupled to the ground plane 210.

The PCB card 212 is demonstrated as extending orthogonally in the Z-direction from the ground plane 210 and having a long dimension along the X-axis. Therefore, the structure and orientation of the PCB card 212 forms the blade structure of the blade antenna system. The extension of the blade antenna system along the Z-axis can be minimal (e.g., approximately two inches) relative to the extension along the X-axis (e.g., approximately nine inches). Accordingly, the blade antenna system can have a low-profile to allow for attachment to an associated vehicle, such as in confined exterior locations. Furthermore, because the PCB card 212 is very thin, the resultant blade antenna system be very aerodynamic in the X-direction for operation as a vehicle-mounted blade antenna.

The blade antenna system also includes a conductive trace portion 218 that can be fabricated as part of the PCB card 212. Therefore, the PCB card 212 and the conductive trace portion 218 can be fabricated in an inexpensive manner and can have a compact form-factor. In the example of FIG. 2, the coaxial connector 214 includes an inner conductor 220 that is conductively coupled to the conductive trace portion 218. Therefore, the conductive trace portion 218 can correspond to a radiating conductor of the blade antenna system, such that the blade antenna system operates as a monopole antenna based on the coupling of the outer conductor 216 with the ground plane 210. The conductive trace portion 218 can be coupled to the PCB card 212 in a parallel manner, such that the conductive trace portion 218 can be arranged on one side of the PCB card 212. As another example, the conductive trace portion 218 can be coupled to the PCB card 212 in a coplanar manner, such that the conductive trace portion 218 can extend through to the opposing side of the PCB card 212 (e.g., with plated through-holes connecting through the PCB card 212). Thus, both sides of the PCB card 212 can be arranged approximately the same.

In the example of FIG. 2, the conductive trace portion 218 is demonstrated as being semi-elliptical in shape having a semi-minor axis arranged at an approximate middle of the length of the PCB card 212 along the X-axis and extending to each of opposing ends of the PCB card 212 in the X and –X directions. A portion of the PCB card 212 having a minimum width between an edge 222 of the conductive trace portion 218 and the ground plane 210 can form a gap 224. The gap 224 can have a minimum dimension between the conductive trace portion 218 and the ground plane 210 along the PCB card 212, with the dimension increasing along the length of the PCB card 212 orthogonal to the ground plane 210 in a nonlinear (e.g., exponential) manner from the approximate middle of the PCB card 212.

The portion of the PCB card 212 that is arranged between the edge 222 of the conductive trace portion 218 and the ground plane 210 on either side of the PCB card 212 can form a first notch 226 and a second notch 228 for the blade antenna system. In the example of FIG. 2, the edge 222 of the conductive trace portion 218 is demonstrated as a nonlinear semi-elliptical shape having a semi-minor axis extending along the approximate middle of the PCB card 212, demonstrated as dotted line 230. As an example, the edge 222 can be defined by the following function $f_1(x)$:

$$f_1(x)=\text{gap}+b-\sqrt{b^2(1-(x/a)^2}$$ Equation 1

Where: gap is the distance of the gap 224 between the edge 222 of the conductive trace portion 218 and the ground plane 210;

- a is the length of the semi-major axis of the semi-elliptical shape of the conductive trace portion 218 from the approximate middle 230 of the PCB card 212;
- b is the height of the semi-minor axis of the semi-elliptical shape of the conductive trace portion 218 along the approximate middle 230 of the PCB card 212.

As an example, gap can be approximately 0.031 inches between the edge 222 of the conductive trace portion 218 and the ground plane 210. The length a of the conductive trace portion 218 along the semi-major axis of the semi-elliptical shape can be approximately four inches, and the height b of the conductive trace portion 218 along the semi-minor axis of the semi-elliptical shape can be approximately two inches.

As another example not depicted in the example of FIG. 2, the edge 222 of the conductive trace portion 218 can be defined by an exponential function. For example, the exponential function $f_2(x)$ can be expressed as follows:

$$f_2(x)=Ae^{Bx}+C$$ Equation 2

Where: A is a user defined variable;

$$B=\frac{1}{a}\ln\left(\frac{b-A}{A}\right);$$

$$C=\text{gap}-A.$$

In Equation 2, the endpoints of the exponential curve are known since the lowest endpoint is defined by $f_2(0)$ and the highest endpoint is defined by $f_2(a)$, as demonstrated below:

$$f_2(0)=\text{gap}=A+C$$ Equation 3

$$f_2(a)=\text{gap}+b=Ae^{Ba}+C$$ Equation 4

Based on Equations 3 and 4 above, one of the three parameters A, B, and C can be user specified to deduce the remaining two parameters. By selecting parameter A to be user specified, then parameters B and C may be calculated, as defined above. However, either of the other variables B and C can be defined instead to allow deduction of the other two of the variables of A, B, and C. As an example, for gap, a, and b to be the same as described above, and A being approximately equal to 0.05 inches, then B can be equal to approximately 0.928 inches$^{-1}$, and C can be equal to approximately –0.019 inches.

As yet another example not depicted in the example of FIG. 2, the edge 222 of the conductive trace portion 218 can be defined by a power function. For example, the power function $f_3(x)$ can be expressed as follows:

$$f_3(x)=\frac{b}{a^p}x^p+\text{gap}$$ Equation 5

Where: exponent p is a user specified variable that defines a taper of the edge 222, where p=1 defines a straight line, p=2 defines a quadratic function, and p=3 defines a cubic function, and where p is not limited to an integer value.

Thus, in any of the examples of Equations 1-5 above, the nonlinear edge 222 can provide for the notches 226 and 228 that can provide for a more broadband impedance match of the blade antenna system. Furthermore, in the examples of Equations 1-5, a ratio of the height b to the overall length of the conductive trace portion 218 2×a is less than one. The structural characteristic of the ratio of height b to twice the length a provides for a low-profile antenna structure while maintaining superior antenna operational characteristics. The nonlinear shape of the edge 222 of the conductive trace portion 218 is not limited to the examples described above in Equations 1-5, and can instead by defined by any of a variety of different functions. Accordingly, the shape of the conductive trace portion 218 can be defined in any of a variety of ways to thereby define the shape of the notches 226 and 228.

In the second view 204, the blade antenna system includes an MDM 232 arranged parallel with the PCB card 212 to cover the notches 226 and 228. The MDM 232 may be realized in the form of a sheet material of approximately uniform thickness and uniform material composition. Alternatively, the MDM 232 can be tapered in thickness or tailored spatially in material properties to effect an improved antenna voltage standing-wave ratio (VSWR) or an improved antenna efficiency. As an example, the MDM 232 can be any of a variety of commercially available MDMs. For example, the MDM 232 can be fabricated as a composite material that includes a host dielectric material (e.g., polytetrafluoroethylene (PTFE)) that can include embedded ferrite particles. In the example of FIG. 2, the MDM 232 is demonstrated as bonded (e.g., adhered via an adhesive material) to cover the notches 226 and 228 and a proper subset portion of the conductive trace portion 218. The edge 222 of the conductive trace portion 218 and the inner conductor 220 of the coaxial connector 214 are demonstrated by dotted lines 230 beneath the MDM 232.

For example, the MDM 232 can be provided on one side or both sides of the blade antenna system. In the example of the MDM 232 being provided on both sides of the PCB card 212, the MDM 232 may have the same thickness on both sides, or it may have dissimilar thicknesses on each side. As an example, the MDM 232 can have a nominal thickness of approximately 0.060 inches on one or both sides of the PCB card 212. Furthermore, the material properties of the MDM 232 on one side of PCB card 212 may be dissimilar from the material properties of the MDM 232 located on the opposite side of PCB card 212 for the purpose of improving antenna bandwidth. Additionally, the material properties of the MDM 232 covering the first notch 226 may be dissimilar from the material properties of the MDM 232 covering the second notch 228, such as to improve antenna bandwidth. Furthermore, the MDM 232 can be provided on both sides of the blade antenna system irrespective of whether the conductive trace portion 218 is provided on one or both sides of the blade antenna system. Therefore, the conductive trace portion 218, the notches 226 and 228, and the MDM 232 can form a radiating element relative to the ground plane 210 for the blade antenna system operating as a monopole antenna.

The inclusion of the MDM 232 as covering the notches 226 and 228 can provide for improved antenna characteristics of the blade antenna system. As an example, the traveling wave antenna characteristic of the blade antenna system is improved relative to conventional antennas that include MDM loading by increasing the electrical length tangential to the ground plane by covering the notches 226 and 228 with the MDM 232. The blade antenna system can exhibit an approximate 35% minimum efficiency over a bandwidth ratio of at least 2:1 (e.g., from approximately 470 MHz to approximately 1080 MHz). In this example, the fractional bandwidth of the blade antenna system can be approximately 0.787. Therefore, the fractional bandwidth of the blade antenna system can be approximately three times the fractional bandwidth of conventional blade monopole antennas with MDM loading, and it can operate at a center frequency that is approximately five times higher than conventional blade monopole antennas with MDM loading. Furthermore, based on the above exemplary parameters, the blade antenna system can provide for a bandwidth-efficiency product of approximately 0.275, which is significantly higher than conventional MDM-loaded antennas. Accordingly, the blade antenna system can be implemented as a lower-profile and more effective antenna than typical monopole blade antennas.

In the third view 206, the blade antenna system is demonstrated as including a dielectric housing 234. The dielectric housing 234 can be formed of a unitary dielectric material that covers the ground plane 210, the PCB card 212, the conductive trace portion 218, and the MDM 232. As an example, the dielectric housing 234 can be formed from a low loss dielectric material, such as any of a polycarbonate, polyurethane, polymer, fiberglass, or composite dielectric material. The dielectric housing 234 can be formed, for example, via an injection molding process, such as to include a recess to accommodate the ground plane 210, the PCB card 212, and the MDM 232. As another example, the dielectric housing 234 can be formed from an additive manufacturing process with a shape designed to cover the ground plane 210, the PCB card 212, and the MDM 232.

The fourth view 208 provides another perspective of the blade antenna system, as an overhead view in the −Z direction. The fourth view 208 demonstrates that the ground plane 210 can be fabricated in an elliptical shape. Thus, along with the thin profile of the blade structure formed by the PCB card 212, the blade antenna system can exhibit improved aerodynamics along the X axis.

Figure 3:
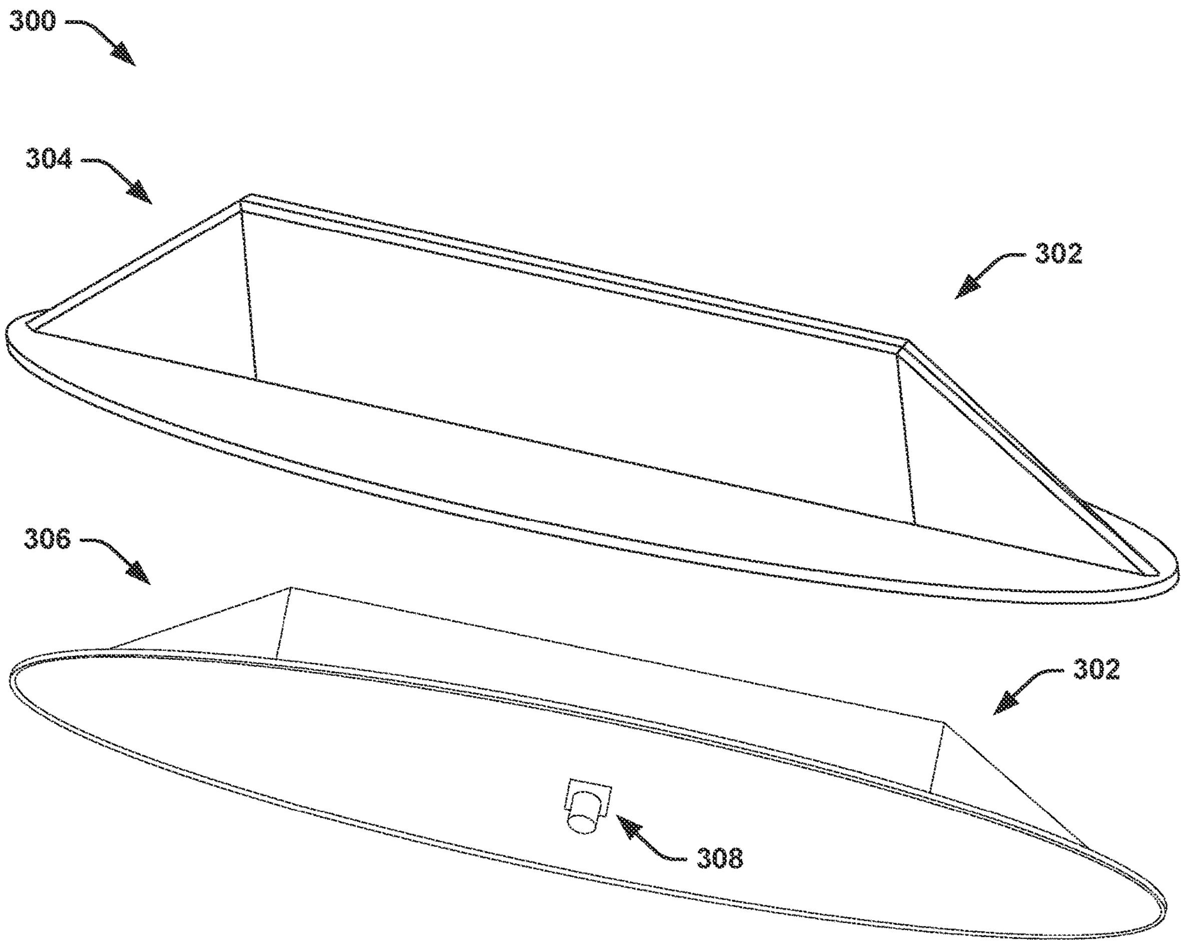
FIG. 3 illustrates an example of perspective views of a blade antenna system.

FIG. 3 illustrates an example diagram 300 of perspective views of a blade antenna system 302. The blade antenna system 302 can correspond to the blade antenna system 100 in the example of FIG. 1 or the blade antenna system in the example of FIG. 2. Therefore, reference is to be made to the examples of FIGS. 1 and 2 in the following description of the example of FIG. 3. The diagram 300 demonstrates the blade antenna system 302 in a first view 304 and a second view 306. The first view 304 demonstrates an overhead view and the second view 306 demonstrates an underside view. In the example of FIG. 3, the blade antenna system 302 includes a coaxial connector 308 in the second view 306, and thus on the underside of the blade antenna system 302. Therefore, the blade antenna system 302 can be mounted flush to the surface of a vehicle (e.g., an aircraft of a spacecraft) to couple to a coaxial cable extending through the surface of the vehicle. The aerodynamic shape of the blade antenna system 302 can thus facilitate minimal drag, while providing superior communications capabilities, as described above.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A blade antenna system comprising:

a ground plane;

a planar substrate material extending orthogonally from the ground plane;

conductive material coupled to the planar substrate material in a coplanar or parallel manner, the conductive material corresponding to a radiating conductor, a portion of the planar substrate material between an edge of the conductive material and the ground plane forming a notch, wherein a shape of the edge of the conductive material is a semi-elliptical shape having a semi-minor axis extending along an approximate middle of the planar substrate material extending to each of opposing ends of the planar substrate material, such that the semi-minor axis forms a gap between the edge of the conductive material and the ground plane at the approximate middle, the gap having a minimum dimension between the conductive material and the ground plane along the shape of the edge of the conductive material; and a magneto-dielectric material (MDM) arranged parallel with the planar substrate material to cover the notch.

2. The system of claim 1, wherein the planar substrate material is arranged as a printed circuit board (PCB) card, wherein the conductive material is a conductive trace portion of the PCB card.

3. The system of claim 1, wherein the edge of the conductive material is symmetrical about an approximate middle of the planar substrate material, such that the conductive material and the ground plane form a first notch and a second notch at opposing ends of the planar substrate material.

4. The system of claim 1, wherein the MDM is adhered to the portion of the planar substrate material to cover the notch.

5. The system of claim 1, wherein the MDM is arranged to cover the notch and a proper subset portion of the conductive material.

6. The system of claim 1, wherein the MDM is coupled to the planar substrate material on each of a first side of the planar substrate material and a second side of the planar substrate material opposite the first side, wherein the MDM is arranged to cover the notch of the planar substrate material.

7. The system of claim 1, further comprising a coaxial connector extending through the ground plane, wherein an inner conductor of the coaxial connector is conductively coupled to the conductive material and an outer conductor of the coaxial connector is conductively coupled to the ground plane to provide the blade antenna system as a monopole antenna.

8. The system of claim 1, further comprising a dielectric housing that is formed of a unitary material that covers the ground plane, the planar substrate material, the conductive material, and the MDM.

9. The system of claim 1, wherein the conductive material has a ratio of height to length that is less than one.

10. A blade antenna system comprising:

a ground plane;

a planar substrate material extending orthogonally from the ground plane;

conductive material coupled to the planar substrate material in a coplanar or parallel manner, the conductive material corresponding to a radiating conductor, an edge of the conductive material forming a nonlinear shape defined by an exponential function from an approximate middle of the planar substrate material extending to each of opposing ends of the planar substrate material, such that a portion of the planar substrate material between the edge of the conductive material and the ground plane forming a first notch and a second notch on opposing ends of the planar substrate material, and such that the portion of the planar substrate material at the approximate middle forms a gap between the edge of the conductive material and the ground plane, the gap having a minimum dimension between the conductive material and the ground plane along the planar substrate material; and a magneto-dielectric material (MDM) arranged parallel with the planar substrate material.

11. The system of claim 10, wherein the MDM is adhered to the portion of the planar substrate material to cover the first and second notches and a proper subset portion of the conductive material.

12. The system of claim 10, wherein the MDM is coupled to the planar substrate material on each of a first side of the planar substrate material and a second side of the planar substrate material opposite the first side, wherein the MDM is arranged to cover the first and second notches of the planar substrate material.

13. A blade antenna system comprising:

a ground plane;

a printed circuit board (PCB) card extending orthogonally from the ground plane, the PCB card comprising a conductive trace portion corresponding to a radiating conductor, a dielectric portion of the PCB card between an edge of the conductive trace portion and the ground plane forming a notch, the conductive trace portion having a ratio of height to length being less than one, wherein a shape of the edge of the conductive trace portion is defined by a power function from an approximate middle of the PCB extending to each of opposing ends of the PCB, such that the portion of the PCB at the approximate middle forms a gap between the edge of the conductive material and the ground plane, the gap having a minimum dimension between the conductive material and the ground plane along the PCB; and a magneto-dielectric material (MDM) arranged parallel with the PCB card.

14. The system of claim 13, wherein the MDM is adhered to the portion of the PCB card to cover the notch and a proper subset portion of the conductive trace portion.

15. The system of claim 13, wherein the MDM is coupled to the PCB card on each of a first side of the PCB card and a second side of the PCB card opposite the first side, wherein the MDM is arranged to cover the notch of the PCB card.

* * * * *